US 7,929,408 B2

United States Patent
Lee et al.

(10) Patent No.: US 7,929,408 B2
(45) Date of Patent: Apr. 19, 2011

(54) METHOD AND APPARATUS FOR JOINT SCHEDULING TO INCREASE FREQUENCY EFFICIENCY AND FAIRNESS IN A MULTI-CHANNEL DISTRIBUTED ANTENNA SYSTEM USING FREQUENCY REUSE AND COMMON POWER CONTROL

(75) Inventors: Jae-Hoon Lee, Seoul (KR); Seong-Taek Hwang, Pyeongtaek-si (KR); Won-Jin Sung, Seoul (KR); Jin-Woo Choe, Seoul (KR); Byoung-Seok Lee, Nonsan-si (KR); In-Hong Shong, Seoul (KR)

(73) Assignees: Samsung Electronics Co., Ltd., Maetan-Dong, Yeongtong-Gu, Suwon-Si, Gyeonggi-Do (KR); Industry-University Cooperation Foundation Sogang University, Sinsu-Dong, Mapo-Gu, Seoul (KR)

( * ) Notice: Subject to any disclaimer, the term of this patent is extended or adjusted under 35 U.S.C. 154(b) by 757 days.

(21) Appl. No.: 11/965,781

(22) Filed: Dec. 28, 2007

(65) Prior Publication Data
US 2008/0205336 A1 Aug. 28, 2008

(30) Foreign Application Priority Data
Feb. 23, 2007 (KR) .................. 10-2007-0018372

(51) Int. Cl.
H04W 28/00 (2009.01)
H04B 7/17 (2006.01)
H04L 27/00 (2006.01)
H04L 1/20 (2006.01)

(52) U.S. Cl. ......... 370/203; 455/522; 375/260; 375/346

(58) Field of Classification Search .................. 370/203, 370/208, 210; 455/522; 375/260, 346
See application file for complete search history.

(56) References Cited

U.S. PATENT DOCUMENTS

| 7,248,841 | B2 * | 7/2007 | Agee et al. ............... 455/101 |
| 7,567,543 | B2 * | 7/2009 | Cao et al. ................. 370/338 |
| 7,711,386 | B2 * | 5/2010 | Sung et al. ............... 455/522 |
| 2008/0045260 | A1 * | 2/2008 | Muharemovic et al. ...... 455/522 |

FOREIGN PATENT DOCUMENTS

| KR | 2002-64939 | 8/2002 |
| KR | 2007-38875 | 4/2007 |
| KR | 2007-80367 | 8/2007 |
| KR | 2007-112701 | 11/2007 |

OTHER PUBLICATIONS

Han et al, Joint Power Control and Blind Beamforming over Wireless Networks: A Cross Layer Approach; EURASIP Journal on Applied Signal Processing 2004:5, pp. 751-761.*

* cited by examiner

Primary Examiner — Chi H Pham
Assistant Examiner — Ahmed Elallam
(74) Attorney, Agent, or Firm — Cha & Reiter, LLC

(57) ABSTRACT

A joint scheduling apparatus and method for increasing frequency efficiency and fairness in a multi-channel distributed antenna system using frequency reuse and common control power. One of a Base Station (BS) or Relay Station (RS) are selected to transmit packets to a Mobile Station (MSs), taking into account Quality of Service (QoS) in one of a BS and an RS and grouped into packet groups. The packets are selected from the packet groups, links corresponding to the packets are grouped into a link group, a joint power control is performed on the link group, link elimination and link addition are performed for the link group until optimal solutions are achieved for the links group, channels are allocated to the links when the optimal solutions are achieved for the links, and the status of a user queue is updated.

12 Claims, 6 Drawing Sheets

METHOD AND APPARATUS FOR JOINT SCHEDULING TO INCREASE FREQUENCY EFFICIENCY AND FAIRNESS IN A MULTI-CHANNEL DISTRIBUTED ANTENNA SYSTEM USING FREQUENCY REUSE AND COMMON POWER CONTROL

CLAIM OF PRIORITY

This application claims the benefit of priority under 35 U.S.C. §119(a) from a Korean Patent Application filed in the Korean Intellectual Property Office on Feb. 23, 2007 and assigned Serial No. 2007-18372, the entire disclosure of which is hereby incorporated by reference in its entirety.

BACKGROUND OF THE INVENTION

1. Field of the Invention

The present invention generally relates to a technique for interaction between a scheduler and a power controller for joint scheduling and power control in a wireless communication system. More particularly, the present invention relates to a technique for joint scheduling and power control among a Base Station (BS) and Relay Stations (RSs) in order to increase fairness and transmission efficiency on a downlink in a multi-channel Distributed Antenna System (DAS) using frequency reuse and common power control.

2. Description of the Related Art

In a conventional cellular system, a scheduler selects packets to be transmitted to Mobile Stations (MSs) according to their priority levels. MSs suffer from different amounts of signal attenuation, frequency selectivity, and interference according to their respective locations at any given time. If the MSs are allocated the same amount of transmit power, they will typically have different Signal-to-Interference and Noise Ratios (SINRs). To make the SINRs of the MSs uniform, a power controller allocates higher power to remote MSs and lower power to nearby MSs.

In a multi-channel DAS using a frequency reuse and common power control protocols, the link between a BS and an RS is established by a dedicated line, such as an optical fiber, and each RS functions like the BS, that is, RSs serve as distributed antennas of the BS. The BS and the RSs have their independent service areas, and frequencies can be reused in the service areas. It may occur that two MSs are located next to the boundary between the service areas, although in the different service areas and sharing the same channel. When a scheduler selects packets for the MSs, the MSs have low SINRs due to interference from the neighboring service areas and thus the transmission of the packets to the MSs is highly probable to result in failure. If higher power is allocated to the MSs to increase their SINRs, the resulting increased mutual interference continues to nullify the effect of the power control. If a subchannel with a low fading gain is allocated to an MS in a multi-channel system, the resulting large signal attenuation leads to much power consumption in order to achieve a target SINR. The increased power interferes with other MSs, thereby decreasing the SINRs of these MSs as well. This interference is a result of power control and channel allocation being performed after scheduling. As scheduling, power control, and channel allocation all take place independently, data transmission to MSs will often fail, or a minimum data rate is not met, thereby causing an outage. Accordingly, there has been a long-felt need in the art to address the aforementioned problems.

SUMMARY OF THE INVENTION

The present invention, as described in the exemplary embodiments herein, addresses in part at least some of the problems and/or disadvantages discussed herein above, and provides at least the advantages described herein below. Accordingly, an exemplary aspect of the present invention is to provide a method and apparatus for efficient interaction among scheduling, power controller, and channel allocation in a multi-channel DAS using frequency reuse and common power control, in order to maximize transmission efficiency and decrease the probability of outage, which is a problem particularly encountered when performing independent scheduling, power control, and channel allocation on a downlink in a cellular system that operates in an Adaptive Modulation and Coding (AMC) channel mode.

In accordance with an exemplary aspect of the present invention, there is provided a joint scheduling for increasing frequency efficiency and fairness in a multi-channel distributed antenna system using frequency reuse and common control power, in which packets to be transmitted to MSs are selected, taking into account QoS in at least one of a BS and an RS and grouped into packet groups, packets are selected from the packet groups, links corresponding to the packets are grouped into a link group, a joint power control is performed on the link group, link elimination and link addition are performed for the link group until optimal solutions are achieved for the links of the link group in the joint power control, channels are allocated to the links when the optimal solutions are achieved for the links, and the status of a user queue of the at least one of the BS and the RS is updated.

In accordance with another exemplary aspect of the present invention, there is provided a joint scheduling apparatus for increasing frequency efficiency and fairness in a multi-channel distributed antenna system using frequency reuse and common control power, in which upon receipt of a data request from an MS directly or via an RS, a BS transmits data to the MS or the RS, a plurality of wired RSs transmit information about MSs within their service areas to the BS and allocate resources to the MSs, and a plurality of MSs are allocated resources from their serving BSs or RSs and receive data using the allocated resources.

BRIEF DESCRIPTION OF THE DRAWINGS

The above features and advantages of certain exemplary embodiments of the present invention described herein will be more apparent from the following detailed description taken in conjunction with the accompanying drawings, in which.

DETAILED DESCRIPTION OF THE INVENTION

Figure 1:
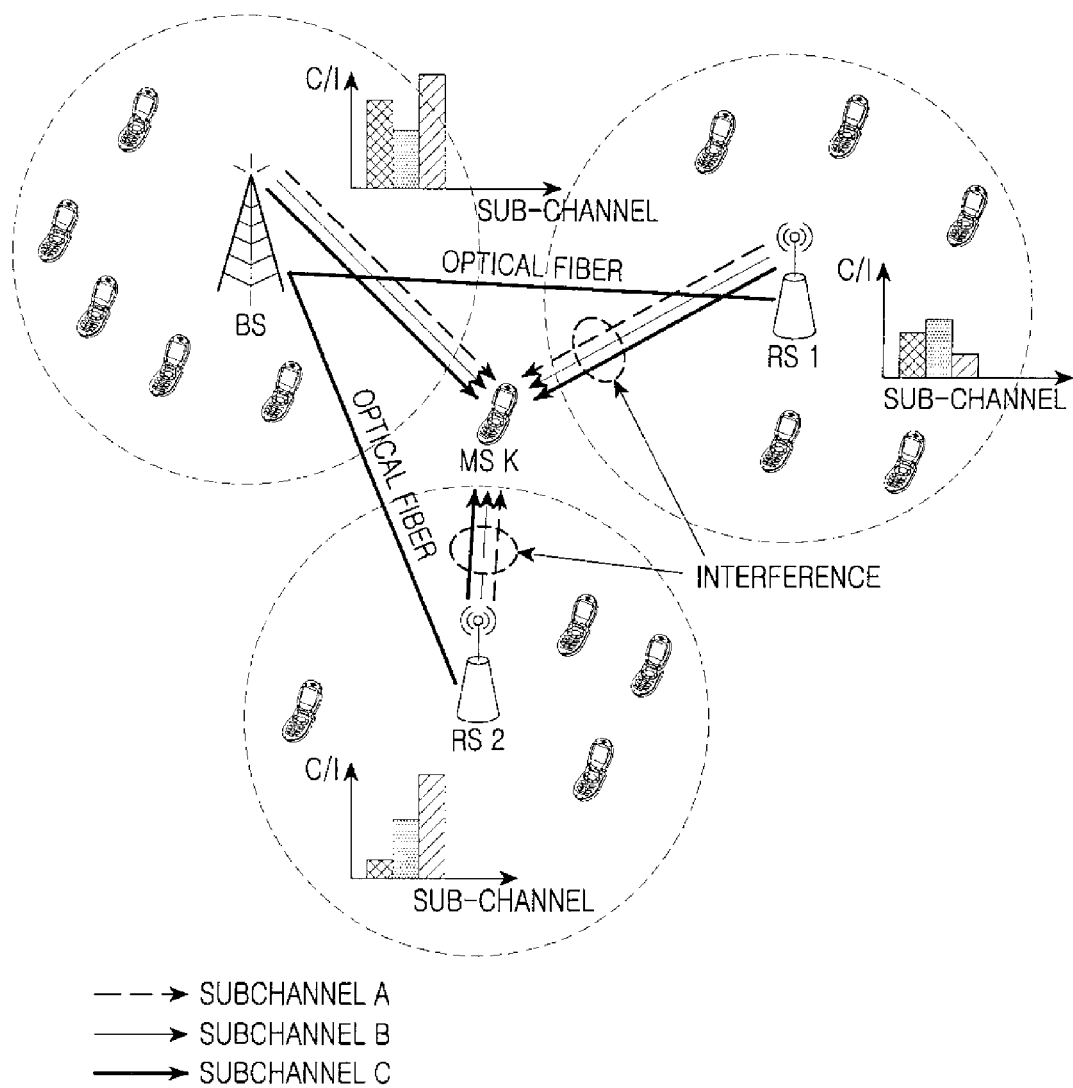
FIG. 1 illustrates an exemplary configuration of a cellular system using frequency reuse and distributed antennas, to which the present invention is applied.

The matters defined in the description such as a detailed construction and elements are provided to assist in a comprehensive understanding of exemplary embodiments of the invention. Accordingly, those of ordinary skill in the art will recognize that various changes and modifications of the embodiments described herein can be made without departing from the scope and spirit of the invention. Also, descriptions of well-known functions and constructions are omitted for clarity and conciseness when their inclusion would obscure appreciation of the invention by a person of ordinary skill in the art.

Throughout the drawings, the same drawing reference numerals will be understood to refer to the same elements, features and structures.

The present invention provides a method and apparatus for decreasing outage probability and maximizing transmission efficiency by efficient interaction among scheduling, power control, and channel allocation. It is assumed for explanatory purposes that a BS and RSs reside within a cell, the BS and the RSs have the same functionalities (each of the BS and RSs is commonly called an RS), and each MS is serviced by an RS. The RSs have their distinctive service areas.

FIG. 1 illustrates an exemplary configuration of a cellular system using frequency reuse and distributed antennas, to which the present invention is applied. Referring to FIG. 1, a $k^{th}$ MS can receive information over a plurality of channels, each channel having frequency selectivity. In other words, a different channel has a different channel gain and experiences a different amount/level/degree of interference from other RSs. The BS typically includes a buffer for buffering transmission data, a packet scheduler, and a Radio Resource Manager (RRM) for performing channel coding, modulation, power control, and channel allocation.

Data is typically transmitted during a scheduling period $T_f$ and signaling is performed for the data transmission. Basically, the scheduler selects packets for MSs from the buffer, i.e. user queues according to their priority levels and the RRM manages resources for the packets, prior to transmission.

In FIG. 1, an RS has as many schedulers for subchannels A, B and C and each scheduler selects a user having a good channel status for a subchannel. This operation is called mapping between a user queue and a subchannel in the RS.

Figure 2:
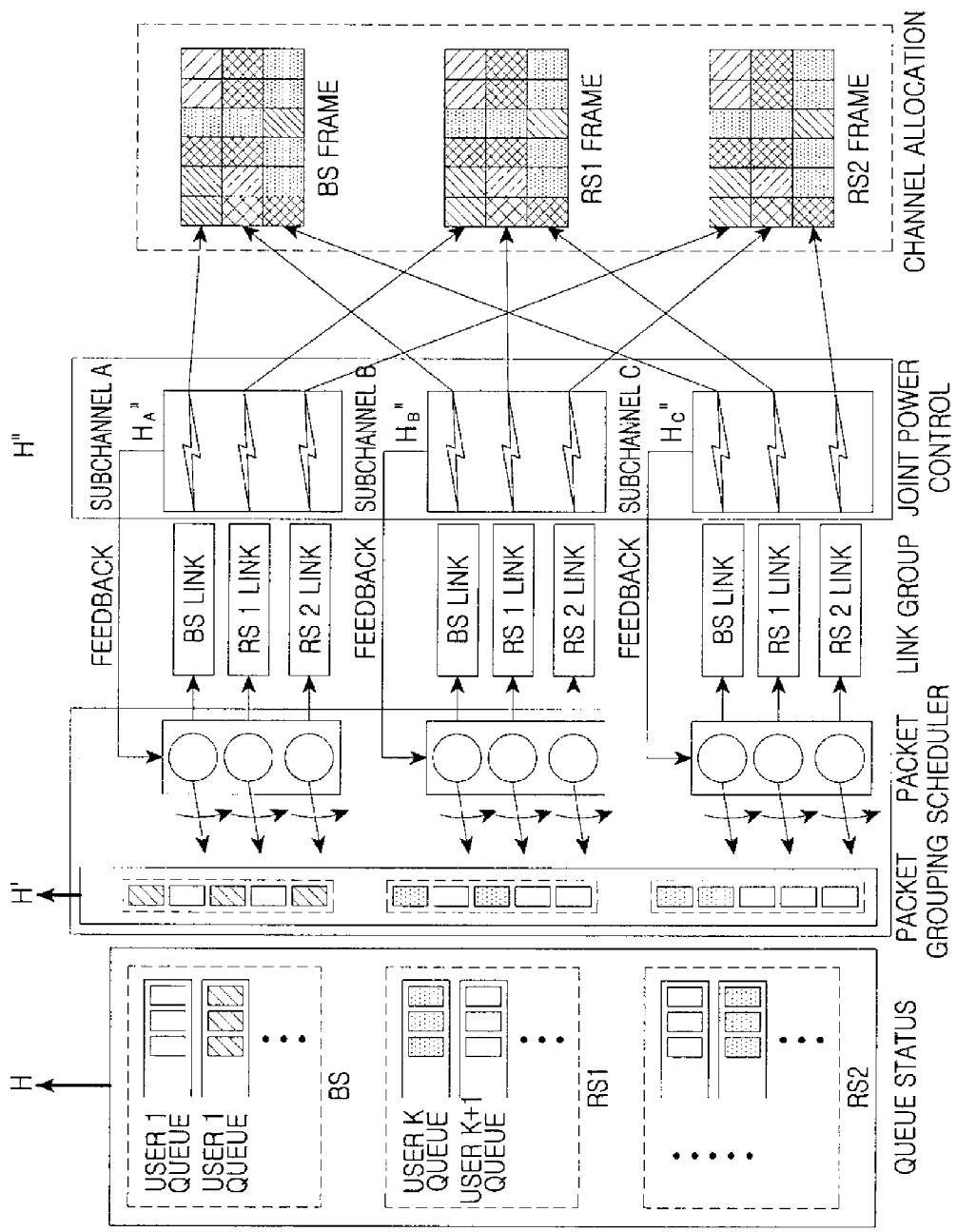
FIG. 2 conceptually illustrates the configuration of a joint scheduling and power control system according to an exemplary embodiment of the present invention.

FIG. 2 provides an illustration of an exemplary configuration of a BS for interaction among scheduling, power control, and channel allocation in a cellular system according to the present invention. The concept of a joint scheduling and power control system according to an exemplary embodiment of the present invention will be explained herein below with reference to FIG. 2.

Referring to FIG. 2, packets to be transmitted to the MSs from the BS and RSs are stored in user queues, and packets to be transmitted during a scheduling period $T_f$ are grouped into packet groups. The packet groups may include packets that do not satisfy Quality of Service (QoS) criteria, and the packets of the packet groups should typically be transmitted during the scheduling period $T_f$ as mentioned above, because many schedulers exist for subchannels. For the service areas of the BS and the RSs, the MSs are selected for data transmission during the scheduling period $T_f$. Herein, a channel matrix representing channels between the BS and RSs and MSs for which packets are queued in the user queues is denoted by H and a channel matrix between the BS and RSs and the MSs for which packets are grouped for transmission is denoted by H'. The channel matrix H' is derived from the channel matrix H. The above operation is called packet grouping.

For the service area of each of the BS and the RSs, the packet schedulers select packets from the packet groups for each subchannel, thus selecting links between MSs and the BS and RSs, to which power control will be applied. A channel matrix representing the channels of the selected links is denoted by H". That is, the schedulers select one MS from each service area for each subchannel. This is called mapping. The selected links share the same channel and thus experience mutual interference. When the links of user queues are mapped to the subchannels, power control is performed in parallel for the subchannels. If the result of the power control of each link group does not meet a minimum SINR, then any link that does not meet the minimum SINR is eliminated and another link on which a packet is to be transmitted is selected through feedback. This operation is repeated until the SINR of each link exceeds the minimum SINR. Then, a channel allocation operation follows the power control, for packet transmission.

To represent the interaction among scheduling, power control, and channel allocation by a mathematical model, the following parameters are defined.

TABLE 1

| Parameter | Description |
| --- | --- |
| $T_f$ | Scheduling period for allocation of one subchannel |
| $k$ ($k = 1, \ldots, K$) | MS index |
| $M$ ($m = 1, \ldots, M$) | RS index |
| $h_{k,m}$ | Channel between $m^{th}$ RS and $k^{th}$ MS |
| $s(m)$ | A set of indexes of MSs serviced by $m^{th}$ RS |
| $P_{k,m}$ | Power allocated to $k^{th}$ MS by $m^{th}$ RS |
| $y_{k,m}$ | Signal received at $k^{th}$ MS from $m^{th}$ RS |
| $w_k$ | Noise at $k^{th}$ MS |
| $P_{min}$, $P_{max}$ | Minimum power and maximum power allocated to $k^{th}$ MS |

Thus, the channel matrix H, a transmission signal matrix X, and a noise matrix W are given as $$H_n = \begin{bmatrix} h_{1,1,n} & \cdots & h_{1,M,n} \\ \vdots & \ddots & \vdots \\ h_{K,1,n} & \cdots & h_{K,M,n} \end{bmatrix}, X_n = \begin{bmatrix} p_{1,1,n} & \cdots & p_{1,M,n} \\ \vdots & \ddots & \vdots \\ p_{K,1,n} & \cdots & p_{K,M,n} \end{bmatrix}, W_n = \begin{bmatrix} w_{1,n} \\ \vdots \\ w_{K,n} \end{bmatrix} \quad (1)$$

A received signal matrix Y on an $n^{th}$ subchannel is expressed as $$Y_n = H_n X_n^T, W_n \quad (2)$$

An element (j, i) of the matrix $Y_n$ denotes a signal for an $i^{th}$ MS received at a $j^{th}$ MS on the $n^{th}$ subchannel, represented as $$y_{j,i,n}(j, i) = \sum_{m=1}^{M} h_{j,m,n} \cdot p_{i,m,n} \quad (3)$$

In Equation (3), the diagonal elements of the received signal matrix $Y_n$ represent desired transmission signals and the other elements of the matrix $Y_n$ represent interference signals. When each RS has a distinctive service area, elements of the matrix $X_n$ representing signals that are not transmitted from the RS become 0s. Thus, $$p_{k,m,n} = \begin{cases} p_{k,m,n} & \text{if } k \in s(m) \\ 0 & \text{otherwise} \end{cases} \quad (4)$$

The packet schedulers select one MS for each service area based on the channel matrix H" as defined in FIG. 2 by appropriate mapping. H" is an M×M square matrix. Then the elements (j, i) of the matrix $Y_n$ is given as $$y_{j,i,n} = h_{j,m,n} \cdot p_{i,m}, n, i \in s(m) \quad (5)$$

A transmission signal and an interference signal received at a $k^{th}$ MS on the $n^{th}$ channel are expressed as Equation (6) and Equation (7), respectively.

$$S_{k,n} = h_{k,m,n} \cdot p_{k,m,n}, k \in s(m) \quad (6)$$

$$I_{k,n} = \sum_{i \neq m}^{M} h_{k,i,n} \cdot p_{s(i),i,n} \quad (7)$$

The SINR of the $n^{th}$ channel at the $k^{th}$ MS is computed by $$\gamma_n^k = \frac{h_{k,m,n} p_{k,m,n}}{\sum_{i \neq m}^{M} h_{k,i,n} \cdot p_{s(i),i,n} + w_{n,k}} \quad (8)$$

Figure 3:
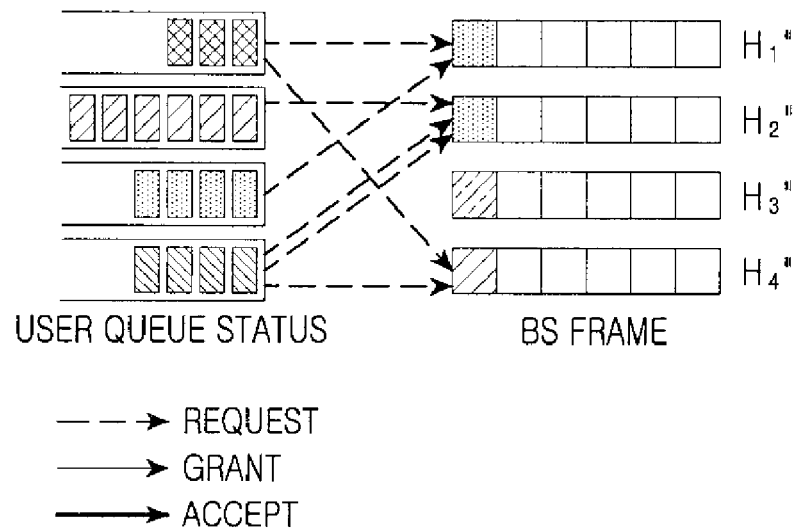
FIG. 3 conceptually illustrates a mapping operation in which each user queue requests subchannels according to an exemplary embodiment of the present invention.
Figure 4:
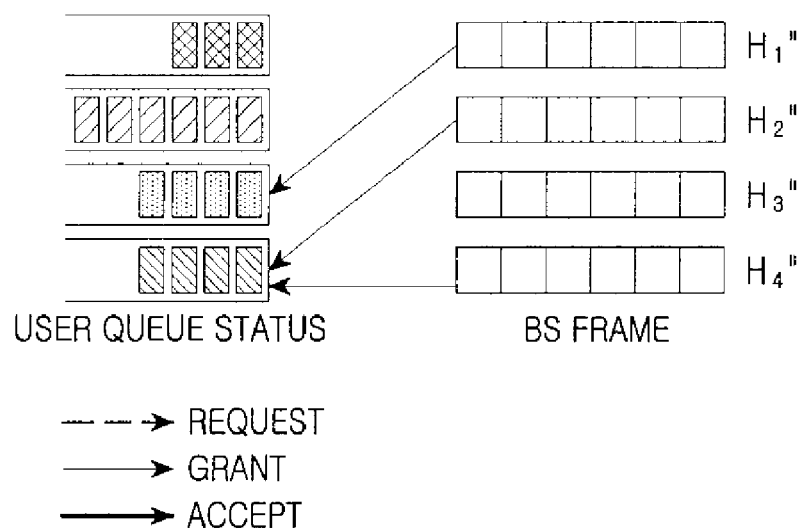
FIG. 4 conceptually illustrates a mapping operation in which subchannels give grants to user queues according to an exemplary embodiment of the present invention.
Figure 5:
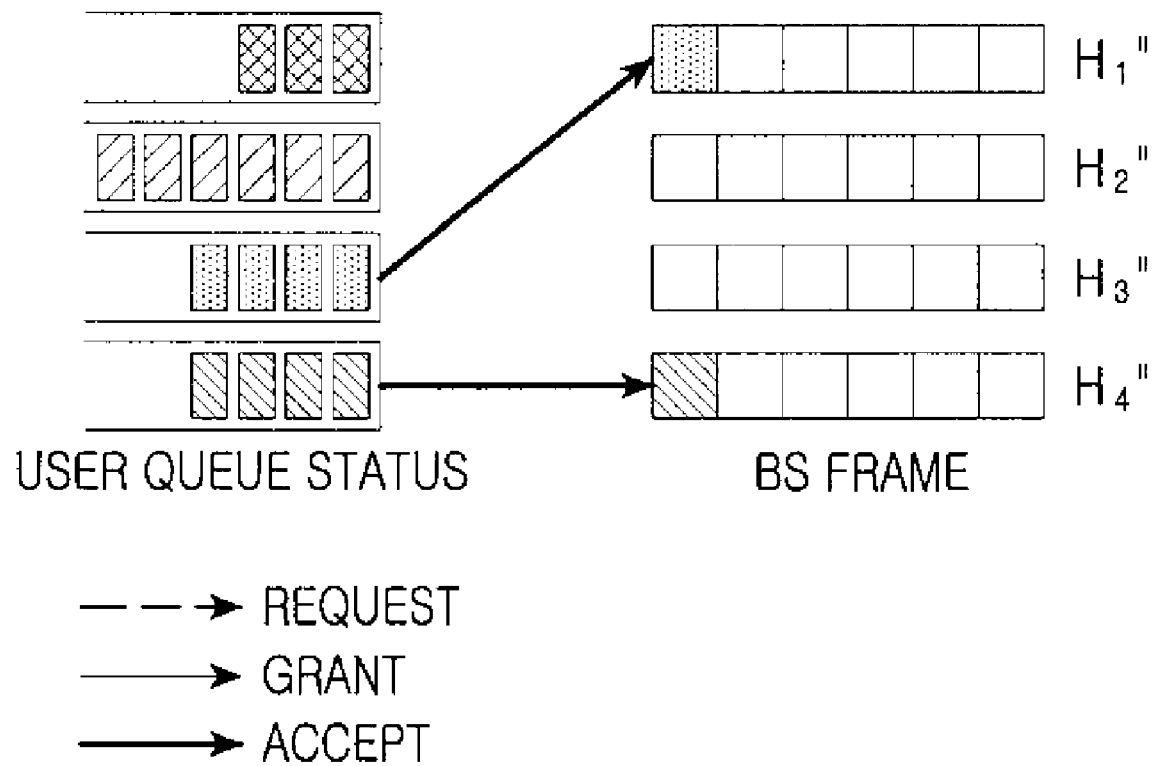
FIG. 5 conceptually illustrates a mapping operation in which user queues accept subchannels according to an exemplary embodiment of the present invention.

To map user queues to subchannels for generation of the channel matrix H" defined in FIG. 2, a channel status is defined by $$I_{k,n} = \sum_{i \neq m} \left( \frac{h_{k,i,n}}{h_{k,m,n}} \right), k \in s(m) \quad (9)$$

where $I_{k,n}$ denotes the amount of interference received on the $n^{th}$ subchannel in the $k^{th}$ MS. As $I_{k,n}$ decreases, the $k^{th}$ MS is in a better channel status of the $n^{th}$ subchannel. The $k^{th}$ MS has $I_{k,n}$ values for all subchannels. The mapping is performed in three steps, Request, Grant, and Accept as illustrated in FIGS. 3, 4 and 5.

Request: user queues request $N_{request}$ subchannels offering good channel status to the user queues.

Grant: each subchannel gives a grant to a user queue with the lowest value of Equation (9) among requesting user queues.

Accept: if two or more subchannels are granted to a user queue, the user queue selects a subchannel that minimizes Equation (9).

FIG. 3 conceptually illustrates an exemplary embodiment of the present invention wherein during a mapping operation each user queue requests subchannels, and FIG. 4 conceptually illustrates an exemplary embodiment of the present invention wherein during a mapping operation subchannels are granted to user queues. Moreover, FIG. 5 conceptually illustrates an exemplary embodiment of the present invention wherein during a mapping operation the user queues accepts subchannels.

Referring to FIGS. 3, 4 and 5, the user queues request $N_{request}$ subchannels offering good channel status. The $N_{request}$ subchannels are granted to user queues that minimize Equation (9). If two or more subchannels are granted to a user queue, the user queue selects a subchannel that minimizes Equation (9) among the subchannels. The operation is repeated until all subchannels are allocated.

According to an exemplary embodiment of the present invention, when a matrix H" is created for each subchannel through the mapping, a joint power control is performed on a subchannel basis. To render the SINRs of MSs uniform, the solution of Equation (8) should be the same for the MSs. However, since Equation (8) is non-linear, a sub-optimal power control algorithm is derived by converting Equation (8) to a linear formula taking the form of maximum$\gamma^k$. This sub-optimal power control algorithm is written in Table 2 below. Since power control is performed on a subchannel basis, a subchannel index n is not shown.

TABLE 2

Objective function
Maximize δ
Constraints 1. minimum SINR to be ensured $$\frac{h_{k,m} p_k}{\sum_{i \neq m}^{M} h_{k,i} \cdot p_i + w_k} \geq \gamma^{targetSINR}, \forall k$$

2. SINR difference $$h_{k,m} p_k - \sum_{i \neq m}^{M} h_{k,i} \cdot p_i - w_k \geq \delta, \forall k$$

3. power range
$p_{min} \leq p_k \leq p_{max}, \forall k$

Referring to Table 2, the difference between a received signal and interference plus noise is set as an optimization constraint (Constraint 2 in Table 2), instead of the ratio of the received signal to the interference signal, and a function that maximizes the variable δ is set as an objective function in the sub-optimal power control algorithm. Constraint 1 describes a target SINR for MSs in the power control and Constraint 3 describes the maximum and minimum values of transmit power. The power control is performed in parallel for the respective subchannels. That is, scheduling becomes different depending on the presence or absence of the optimal solution of the power control.

Figure 6:
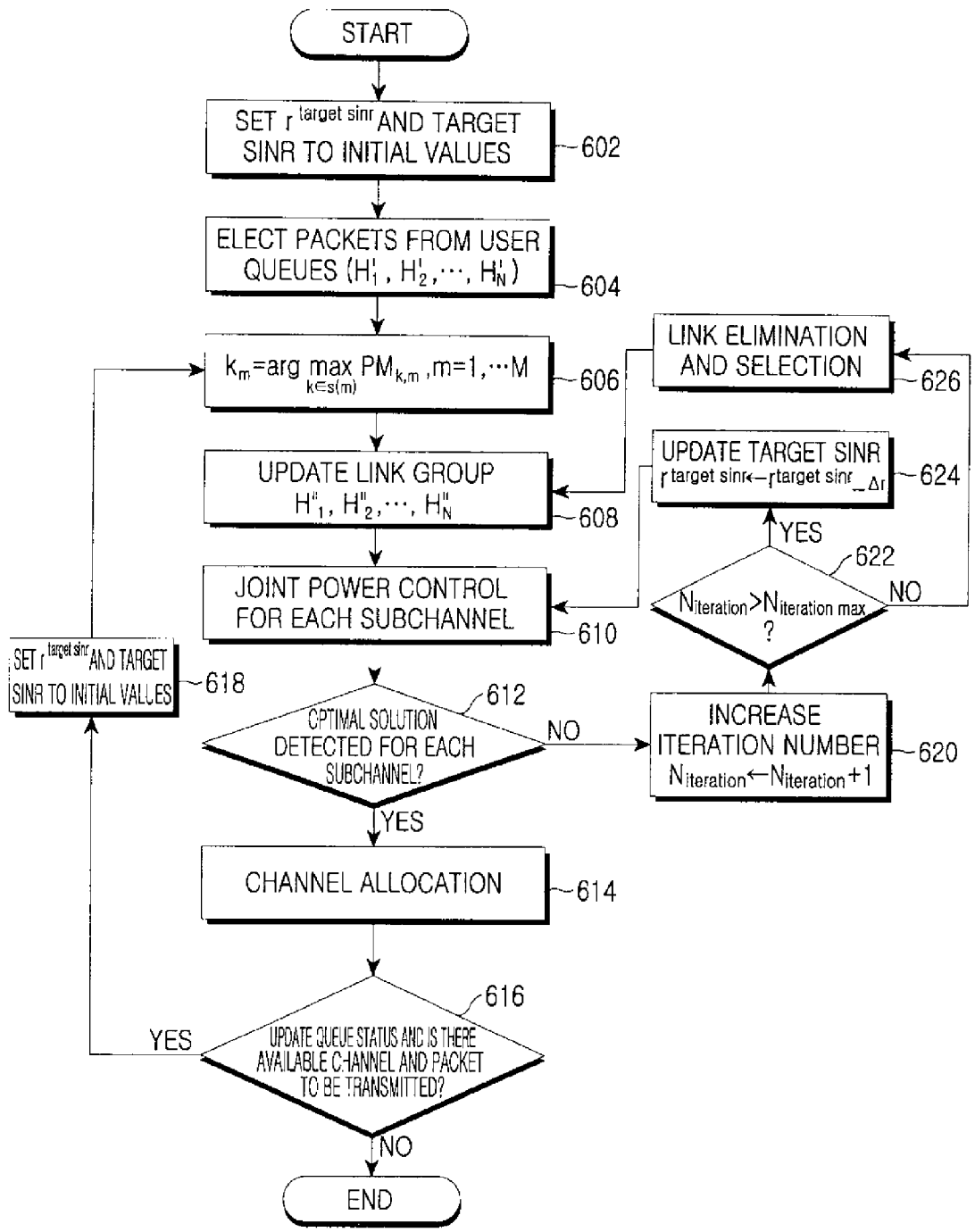
FIG. 6 is a flowchart illustrating a joint scheduling and power control operation in AMC channel mode according to an exemplary embodiment of the present invention.

FIG. 6 is a flowchart illustrating a joint scheduling and power control operation in AMC channel mode according to an exemplary embodiment of the present invention.

Referring to FIG. 6, the target SINR and $\gamma^{targetSINR}$ are set to initial values in step 602 and packets are selected from user queues of the BS and each RS according to Equation (10) in steps 604 and 606.

$$k_m^* = \arg\max_{k \in s(m)} PM_{k,m} \quad (10)$$

where $PM_{k,m}$ denotes a priority metric for a $k^{th}$ user queue in an $m^{th}$ RS. The priority metric can be a time delay or a queue length.

The channel matrix H" is created for the selected packets and power control and channel allocation are performed. Scheduling is completed when there are no more packets to be transmitted or no more channels to be allocated. These operations are performed when the power control is successful. If the optimal solution of the power control does not exist, link elimination and addition is performed and then power control is performed in step 608. A criterion for the link selection is expressed as Equation (11).

$$k_m^* = \arg\min_{k \in s(m)} \sum_{i \neq m}\left(\frac{h_{k,i,n}}{h_{k,m,n}}\right) \quad (11)$$

which implies that a link in the best channel status of an $n^{th}$ subchannel is selected in the service area of the $m^{th}$ RS.

A criterion for the link elimination is expressed as Equation (12).

$$k^* = \arg\max_{k \in s(m)}\left(\sum_{i \neq m}\left(\frac{h_{k,i,n}}{h_{k,m,n}}\right) + \sum_{j \neq m}\left(\frac{h_{k,j,n}}{h_{s(j),j,n}}\right)\right) \quad (12)$$

where $h_{s(j),j,n}$ denotes the channel status of the $n^{th}$ subchannel between a $j^{th}$ RS and an MS s(j) within the service area of the $j^{th}$ RS.

Figure 7:
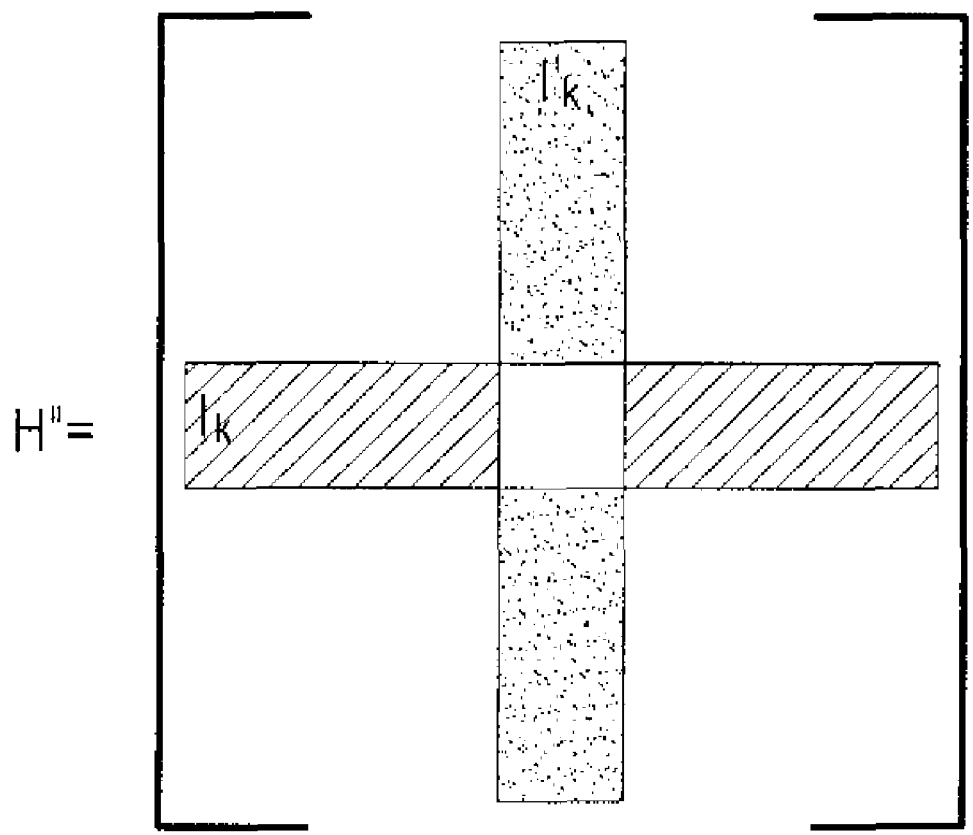
FIG. 7 illustrates a channel matrix referred to for describing link selection and elimination according to an exemplary embodiment of the present invention.

Equation (11) and Equation (12) assume the property depicted in FIG. 7. FIG. 7 illustrates a channel matrix referred to for describing link selection and elimination according to an exemplary embodiment of the present invention. Referring to FIG. 7, a link with the highest sum of interference $I_k$ received at an MS from other serving BS or RSs and interference $I'_k$ at the MS from its serving BS or RS is selected from the matrix H". In the absence of an optimal solution of power control, the link is eliminated and a particular link is selected to fill the space. Then a joint power control is performed.

Thus, a joint power control is performed on the matrix H" updated by the link elimination and addition according to Equation (11) and Equation (12) in step 610. In the absence of an optimal solution in step 612, the link elimination and addition is performed at step 620. As the number of H" updates through link elimination and addition increases, computation complexity increases, causing operational problems. Therefore, it is typically necessary to limit the number of H" updates, taking into account limited power and computation volume. To reduce the number of H" updates, the target SINR is reduced and then power control is performed for the decreased target SINR. Since the probability of achieving an optimal solution is increased by alleviating Constraint 1 in Table 2, the target SINR is decreased to or below a predetermined value. The number of iterations $N_{iteration}$ is counted each time the power control is performed in step 620. If the number of iterations $N_{iteration}$ is larger than a maximum iteration number $N_{iterationmax}$ in step 622, the target SINR is decreased to a predetermined value in step 624 and the procedure returns to step 610. If the number of iterations $N_{iteration}$ is less than or equal to the maximum iteration number $N_{iteration\ max}$ in step 622, a link is replaced with another link according to Equation (11) and Equation (12) in step 626, thus updating the link group H" in step 608.

On the other hand, in the presence of an optimal solution in step 612, a channel is allocated in step 614. Then the status of the user queues is updated and it is determined in step 616 whether there remains a channel to be allocated and a packet to be transmitted. If there is an available channel and a packet to be transmitted, the target SINR and $\gamma^{targetSINR}$ are set to initial values in step 618 and the procedure returns to step 606. In the absence of an available channel or a packet to be transmitted in step 616, the scheduling is completed.

As is apparent from the above exemplary description, the present invention overcomes outage caused by interference from neighbor service areas and increases transmission efficiency through efficient interaction among scheduling, power control, and channel allocation in a multi-channel DAS using frequency reuse and common power control.

While the invention has been shown and described with reference to certain exemplary embodiments of the present invention thereof, it will be understood by those skilled in the art that various changes in form and details may be made therein without departing from the spirit the present invention and the scope of the appended claims. A person of ordinary skill in the art understands and appreciates that the examples provided herein that are shown in the drawings are provided for explanatory purposes, and the invention is not limited to the exemplary embodiments shown and described.

What is claimed is:

1. A joint scheduling method for increasing frequency efficiency and fairness in a multi-channel distributed antenna system using frequency reuse and common control power, comprising:
   (a) selecting packets for transmission to Mobile Stations (MSs), said selecting taking into account a Quality of Service (QoS) in at least one of a Base Station (BS) and a Relay Station (RS), grouping the packets into packet groups, and mapping packets from the MSs to subchannels;
   (b) selecting packets from the packet groups formed in step (a), grouping links corresponding to the packets into a link group, and performing a joint power control on the link group;
   (c) performing link elimination and link addition in the link group until optimal solutions are achieved for the links of the link group in the joint power control; and
   (d) allocating channels to the links when the optimal solutions are achieved for the links in step (c) and updating the status of a user queue for at least one of the BS and the RS.

2. The joint scheduling method of claim 1, wherein the QoS-based packet selection in step (a) comprises
   selecting the packets for the MSs according to priority levels of the MSs;
   generating a channel matrix based on the packets of the MSs by mapping the packets to subchannels according to the following equation $$I_{k,n} = \sum_{i \neq m}\left(\frac{h_{k,i,n}}{h_{k,m,n}}\right), k \in s(m)$$

where $I_{k,n}$ denotes the amount of interference received on an $n^{th}$ subchannel at a $k^{th}$ MS and as $I_{k,n}$ decreases, and the $k^{th}$ MS is in a better channel status of the $n^{th}$ subchannel, the $k^{th}$ MS having $I_{k,n}$ values for all subchannels.

3. The joint scheduling method of claim 2, wherein the QoS-based packet selection comprises selecting the packets for the MSs according to priority levels of the MSs by the following equation $$k_m^* = \arg\max_{k \in s(m)} PM_{k,m}$$

where $PM_{k,m}$ denotes a priority metric for a $k^{th}$ user queue in an $m^{th}$ RS and the priority metric can be one of time delay and a queue length.

4. The joint scheduling method of claim 2, wherein the mapping comprises:
requesting $N_{request}$ subchannels offering good channel status for user queues;
granting each of $N_{request}$ subchannels to a user queue among the user queues according to Equation (9);
accepting a subchannel that minimizes Equation (9) for a user queue, if at least two subchannels are granted for the user queue; and
repeating the requesting, granting, and the accepting steps until all subchannels are allocated.

5. The joint scheduling method of claim 1, wherein the link elimination and addition comprises in step (c):
(i) counting the number of power control iterations each time an optimal solution does not exist;
(ii) performing a joint power control after decreasing a target Signal-to-Interference and Noise Ratio (SINR), if the number of power control iterations is larger than a predetermined value; and
(iii) updating the link group by eliminating a link from the link group and selecting another link and performing a joint power control on the updated link group.

6. The joint scheduling method of claim 5, wherein the link group updating in sub-step (iii) comprises selecting another link according to $$k_m^* = \arg\min_{k \in s(m)} \sum_{i \neq m} \left( \frac{h_{k,i,n}}{h_{k,m,n}} \right)$$

which implies that a link in the best channel status of an $n^{th}$ subchannel is selected in the service area of an $m^{th}$ RS, and eliminating a link according to $$k^* = \arg\max_{k \in s(m)} \left( \sum_{i \neq m} \left( \frac{h_{k,i,n}}{h_{k,m,n}} \right) + \sum_{j \neq m} \left( \frac{h_{k,j,n}}{h_{s(j),j,n}} \right) \right)$$

where $h_{s(j),j,n}$ denotes the status of an $n^{th}$ subchannel between a $j^{th}$ RS and an MS $s(j)$ within the service area of the $j^{th}$ RS.

7. A joint scheduling apparatus for increasing frequency efficiency and fairness in a multi-channel distributed antenna system using frequency reuse and common control power, comprising:
means for selecting packets for transmission to Mobile Stations (MSs), said selecting taking into account a Quality of Service (QoS) in at least one of a Base Station (BS) and a Relay Station (RS) and grouping the packets into packet groups;
means for selecting packets from the packet groups formed in step (a), grouping links corresponding to the packets into a link group, and for performing a joint power control on the link group;
means for performing link elimination and link addition in the link group until optimal solutions are achieved for the links of the link group in the joint power control; and
means for allocating channels to the links when the optimal solutions are achieved for the links and updating the status of a user queue for at least one of the BS and the RS.

8. The joint scheduling apparatus according to claim 7, wherein the means for packet selection for transmission to the MSs comprises means for selecting the packets for the MSs according to priority levels of the MSs, and for generating a channel matrix based on the packets of the MSs by mapping the packets to subchannels according to the following equation $$I_{k,n} = \sum_{i \neq m} \left( \frac{h_{k,i,n}}{h_{k,m,n}} \right), k \in s(m)$$

where $I_{k,n}$ denotes the amount of interference received on an $n^{th}$ subchannel at a $k^{th}$ MS and as $I_{k,n}$ decreases, and the $k^{th}$ MS is in a better channel status of the $n^{th}$ subchannel, the $k^{th}$ MS having $I_{k,n}$ values for all subchannels.

9. The joint apparatus according to claim 8, wherein the means for QoS-based packet selection comprises means for selecting the packets for the MSs according to priority levels of the MSs by the following equation $$k_m^* = \arg\max_{k \in s(m)} PM_{k,m}$$

where $PM_{k,m}$ denotes a priority metric for a $k^{th}$ user queue in an $m^{th}$ RS and the priority metric can be one of a time delay and a queue length.

10. The joint scheduling method of claim 8, wherein the means for mapping comprises means for requesting $N_{request}$ subchannels offering good channel status for user queues, and means for granting each of $N_{request}$ subchannels to a user queue among the user queues according to Equation (9), and for accepting a subchannel that minimizes Equation (9) for a user queue, if at least two subchannels are granted for the user queue; and repeating the requesting, granting, and the accepting steps until all subchannels are allocated.

11. The joint scheduling method of claim 7, wherein the means for link elimination and additionally comprises means for: (i) counting the number of power control iterations each time an optimal solution does not exist; (ii) performing a joint power control after decreasing a target Signal-to-Interference and Noise Ratio (SINR), if the number of power control iterations is larger than a predetermined value; and (iii) updating the link group by eliminating a link from the link group and selecting another link and performing a joint power control on the updated link group.

12. The joint scheduling method of claim 11, wherein the link group means for updating in sub-step (iii) comprises selecting another link according to $$k_m^* = \arg\min_{k \in s(m)} \sum_{i \neq m} \left( \frac{h_{k,i,n}}{h_{k,m,n}} \right)$$

which implies that a link in the best channel status of an $n^{th}$ subchannel is selected in the service area of an $m^{th}$ RS, and eliminating a link according to $$k^* = \arg\max_{k \in s(m)} \left( \sum_{i \neq m} \left( \frac{h_{k,i,n}}{h_{k,m,n}} \right) + \sum_{j \neq m} \left( \frac{h_{k,j,n}}{h_{s(j),j,n}} \right) \right)$$

where $h_{s(j),j,n}$ denotes the status of an $n^{th}$ subchannel between a $j^{th}$ RS and an MS $s(j)$ within the service area of the $j^{th}$ RS.

* * * * *